US006957418B2

United States Patent
Batcha et al.

(10) Patent No.: US 6,957,418 B2
(45) Date of Patent: Oct. 18, 2005

(54) SYSTEM AND METHOD OF DESIGNING, TESTING, AND EMPLOYING GRAPHICAL COMPUTER CODE

(75) Inventors: Thomas Rudolph Batcha, Colorado Springs, CO (US); Kipper Kyle Fulghum, Colorado Springs, CO (US); Thomas Joseph Walton, Colorado Springs, CO (US); Michael Thomas Juran, Colorado Springs, CO (US)

(73) Assignee: Altia, Inc., Colorado Springs, CO (US)

(*) Notice: Subject to any disclaimer, the term of this patent is extended or adjusted under 35 U.S.C. 154(b) by 525 days.

(21) Appl. No.: 09/767,509

(22) Filed: Jan. 23, 2001

(65) Prior Publication Data

US 2002/0097269 A1 Jul. 25, 2002

(51) Int. Cl.[7] .................................................. G06F 9/44
(52) U.S. Cl. ...................................... 717/124; 717/100
(58) Field of Search .............................. 717/124, 100, 717/113; 395/763, 967

(56) References Cited

U.S. PATENT DOCUMENTS

| | | | | |
|---|---|---|---|---|
| 4,315,315 A | * | 2/1982 | Kossiakoff .................... 717/109 |
| 4,827,404 A | * | 5/1989 | Barstow et al. ................ 703/20 |
| 5,566,294 A | * | 10/1996 | Kojima et al. ............... 345/866 |
| 5,590,271 A | * | 12/1996 | Klinker ......................... 345/763 |
| 5,596,695 A | * | 1/1997 | Hamada et al. .............. 345/763 |
| 5,727,175 A | * | 3/1998 | Malone et al. ............... 345/763 |
| 5,760,788 A | * | 6/1998 | Chainini et al. ............. 345/474 |
| 5,774,122 A | * | 6/1998 | Kojima et al. ............... 345/848 |
| 5,883,639 A | | 3/1999 | Walton et al. ................ 345/473 |
| 5,966,532 A | | 10/1999 | McDonald et al. .......... 395/701 |
| 5,991,535 A | * | 11/1999 | Fowlow et al. .............. 717/107 |
| 6,005,576 A | * | 12/1999 | Kojima et al. ............... 345/810 |
| 6,053,951 A | | 4/2000 | McDonald et al. ............. 717/1 |
| 6,189,138 B1 | * | 2/2001 | Fowlow et al. .............. 717/107 |
| 6,412,106 B1 | * | 6/2002 | Leask et al. ................. 717/124 |
| 6,505,343 B1 | * | 1/2003 | Menon et al. ............... 717/116 |
| 6,564,368 B1 | * | 5/2003 | Beckett et al. .............. 717/113 |
| 6,606,741 B2 | * | 8/2003 | Kojima et al. .............. 717/109 |
| 6,618,851 B1 | * | 9/2003 | Zundel et al. ............... 717/103 |

OTHER PUBLICATIONS

"Artisan Software Tools Introduces Integration of Real–Time Studio Professional with Altia FacePlate 4.0", PRESS Relaease, 1999, 2 pages.*
"Telelogic and Altia Partner to Provide Advanced Visual Prototyping: Telelogic and Altia FacePlate Enable Faster More Cost Effective Visual Prototypes for SDL:Applications", Business Wire, Dec. 3, 2001, 3 pages.*
"Inspiring Engineers Altia Inc.", mention of FACEPLATE release early Jul. 1999, printed on Apr. 8, 2004, 4 pages.*
"Altia Announces the Release of Alti Design 4.5", PRess Release, 2 pages Jul. 5, 2001.*
"Compact Graphics Code", Tom Batcha , Embedded .com, 9 pages Nov. 30, 2001.*
"Iconic Programming for Teaching the First Year Programming Sequence", Calloni et al, Dept. of Comp Sci, Texas Tech Univ. Lubbock, TX., 1995, IEEE, 2a5.10—2a5.13 vol. 1.*

(Continued)

Primary Examiner—Todd Ingberg
(74) Attorney, Agent, or Firm—Law Office of Dale B. Halling, LLC

(57) ABSTRACT

A system for designing, testing, and employing graphical computer code includes a graphics editor for creating a graphical display. The graphical display is made up of a plurality of graphical objects constructed by the graphics editor. A translator creates a high-level computer language code of the graphical object. The translator is connected to the graphics editor. A compiler receives the high level computer language code from the translator.

26 Claims, 4 Drawing Sheets

FIG. 1

OTHER PUBLICATIONS

"1988 IEEE Workshop on Visual Languages", IEEE Workshop, Oct. 10–12, 1988, 1 page.*
"Iconic Programming:Where To Go?", Ichikawa et al, IEEE Software, Nov 1990, pp. 63–68, vol. 7, issue 6.*
"An Iconic Programming System, HI–VISUAL1", Hirakawa M. et al.,IEEE publication 1990, pp. 1178–1184, vol. 16, issue 10.*
"HI_VISUAL as a User Customizable Visual Programming Environment", IEEE, , Miller E, et al, Sep. 1995, pp. 5–9.*
"Improving Readability of Iconic Programs with Multiview Object Representation", Kokie Y, et alm IEEE, Sep. 1995.pp. 37–44.*
"Beginning Visual C++ 5", Ivor Horton, Mar. 19, 1997, pp. 152–156.*
SoftWIRE Graphical Programming for Visual Basic, SoftWIRE, pp. 1–40, Version 2.0.*
Visual Object Oriented Programming Concepts and Environments, M.M. Burnett et al, pp. 1–274, published 1994.*

* cited by examiner

SYSTEM AND METHOD OF DESIGNING, TESTING, AND EMPLOYING GRAPHICAL COMPUTER CODE

FIELD OF THE INVENTION

The present invention relates generally to the field of software for developing user interfaces and more particularly to a system and method for designing, testing, and employing graphical computer code.

BACKGROUND OF THE INVENTION

Computer software and systems for creating user interface prototypes are currently in existence. The existing software allows the user to create new user interfaces, limited only by the user's imagination and the software's graphical limitations. The prototype interfaces created with this software save time and money by allowing the creation of control panels for hardware and software with a computer, instead of requiring the user to manufacture time and labor intensive prototype hardware. The software programs allow designers to create user interfaces without knowledge of complicated programming languages. Once the interface is created, the computer code necessary to drive the actual interface needs to be tailored to the operating parameters of the actual device. However, the computer code that would drive these user interfaces has to be created separately, effectively reinventing the user interface already created with the software. This duplicates effort and wastes resources. One solution has been to create graphical code templates, written in a high-level computer language, that are copied into an overall graphics program. Unfortunately, there are a limited number of templates and the ability to tailor the templates is extremely limited.

Thus there is a need for a system that allows not only the creation of new user interfaces that meet the requirements of new products, but also automatically creates the computer code to drive the user interface in the new product.

DETAILED DESCRIPTION OF THE DRAWINGS

A system for designing, testing, and employing graphical computer code includes a graphics editor for creating a graphical display. The graphical display is made up of a plurality of graphical objects constructed by the graphics editor. A translator creates a high-level computer language code of the graphical object. The translator is connected to the graphics editor. A compiler receives the high-level computer language code from the translator. An advantage of this system is that it automatically creates code that is ready to be installed in the finished product.

Figure 1:
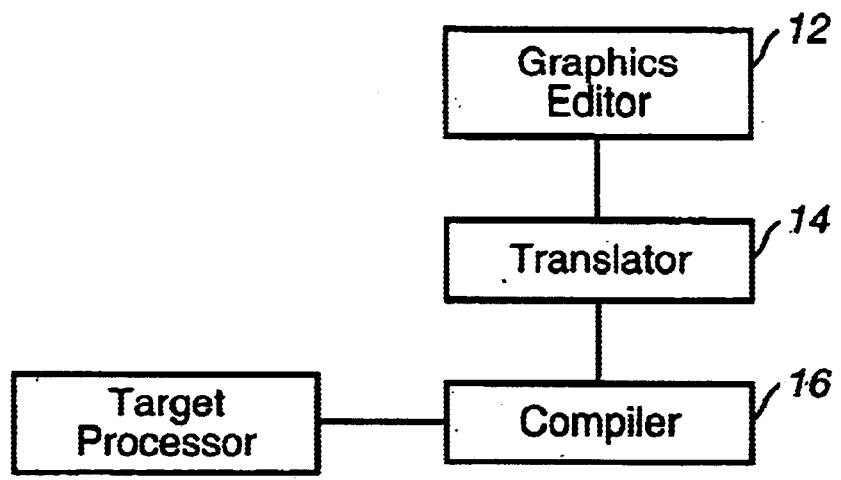
FIG. 1 is a block diagram of a system for designing, testing, and employing graphical computer code in accordance with one embodiment of the invention.

FIG. 1 is a block diagram of a system 10 of designing, testing, and employing graphical computer code in accordance with one embodiment of the invention. The graphics editor 12 creates a graphical display made up of a plurality of graphical objects constructed by the graphics editor. A translator 14 is connected to the graphics editor 12. The translator 14 creates a high-level computer language code from the graphical objects. A compiler 16 receives the high-level computer language code from the translator 14. In one embodiment, a run time system is connected to the graphics editor 12 and is designed to execute a graphical design. In another embodiment, a control editor is connected to the graphics editor 12 and allows a user to embed logic into the graphics. Design elements may be assembled from primitive graphical objects. These design elements may be assigned particular behaviors in response to assigned stimuli, or the design elements may created to supply stimuli to direct a particular display behavior.

In another embodiment, a library of graphical objects is connected to the graphics editor 12. These graphical objects are created using the graphics editor 12 and are stored in the library. The translator 14 has a number of options, such as translating a graphical objects input stimulus, translating a graphical objects control logic, allowing dynamic memory allocation, and selecting a subset of graphical objects. The translator 14 also has the capability of sizing a data structure. The translator 14 examines the graphical object selected to be translated. The data structure's primitive graphical objects, from which the generated code is built, are then sized based upon the number and type of graphical objects selected. This allows the system to create a final, compiled version of the code in as small a space as is possible, or any reasonable size limitation.

Figure 2:
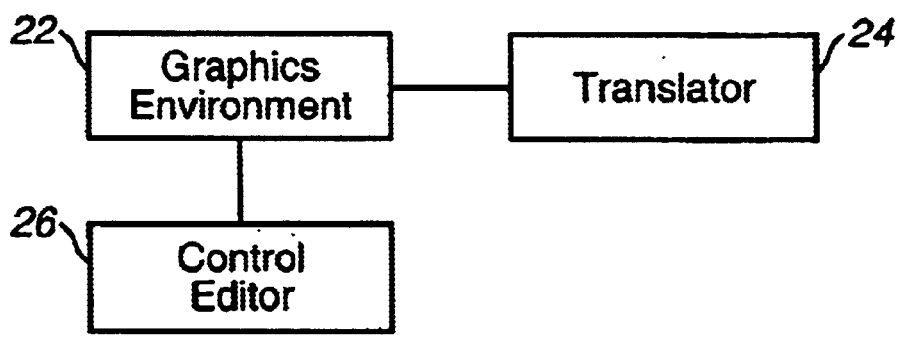
FIG. 2 is a block diagram of a system for designing, testing, and employing graphical computer code in accordance with one embodiment of the invention.

FIG. 2 is a block diagram of a system 20 for designing, testing, and employing graphical computer code in accordance with one embodiment of the invention. A graphics environment 22 creates a graphical display made up of a plurality of graphical objects constructed by the graphics environment 22. A translator 24 is connected to the graphics environment 22 and creates a high-level computer language code. A control editor 26 is connected to the graphics environment 22, and allows a user to embed logic into the graphics. In one embodiment, the graphics environment 22 contains a library of components, e.g., push-buttons, knobs, sliders, etc., and a run time system, and the run time system is designed to execute a graphical design, e.g., the run time system may operate as a real time simulation of the user interface, as described by the assembly of the components from the library, and as directed to operate by the stimulus and response programming. Such a system will allow a user to see exactly what the final interface will look like. More importantly, the system will allow the user to quickly and cheaply test the function of each feature of the user interface, even allowing the connection of the graphical interface to actual, and not simulated, hardware to fully test the interface's functionality.

Figure 3:
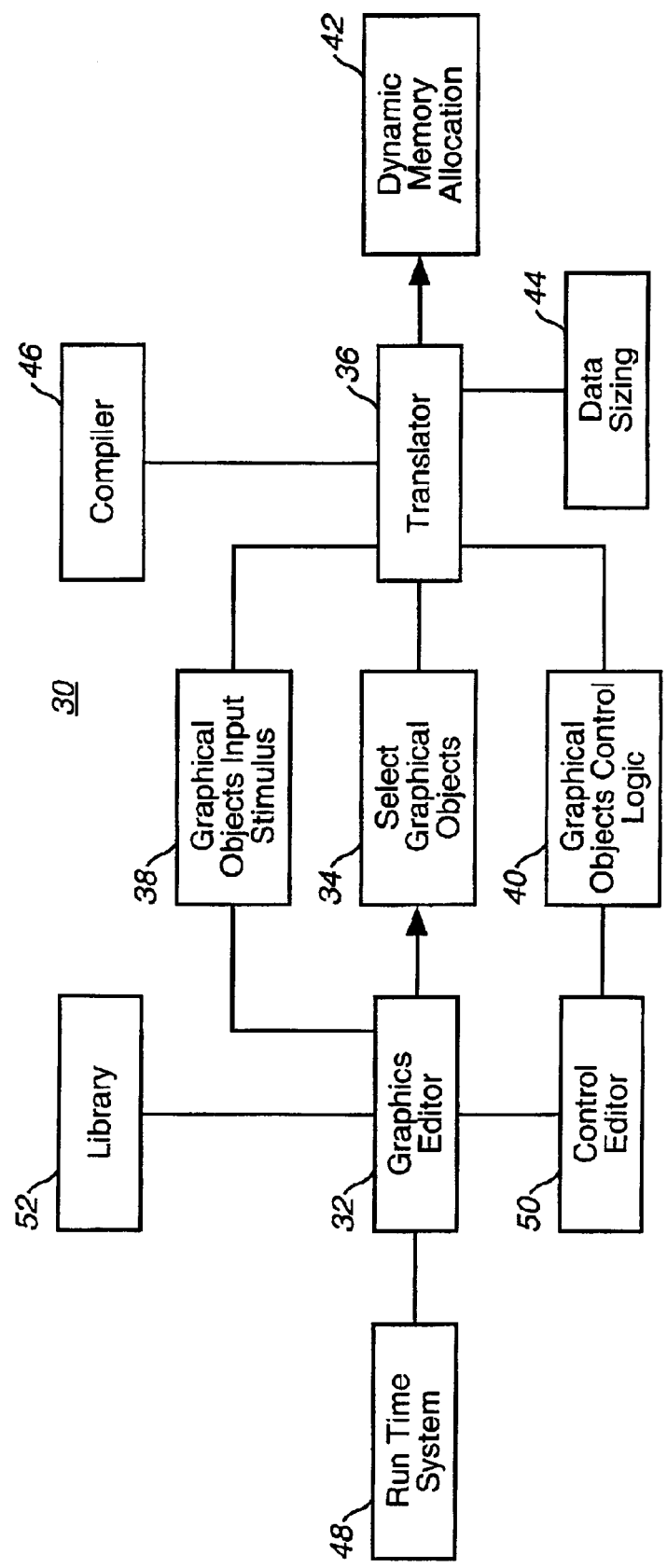
FIG. 3 is a block diagram of a system for designing, testing, and employing graphical computer code in accordance with one embodiment of the invention.

FIG. 3 is a block diagram of a system 30 for designing, testing, and employing graphical computer code in accordance with one embodiment of the invention. The graphics editor 32 creates a graphical display made up of a plurality of graphical objects 34, e.g., push-buttons, knobs, sliders, etc., and previously-constructed display components, constructed by the graphics editor 32. A translator 36 is connected to the graphics editor 32 and creates a high-level computer language program, in a language such as C, from the graphics editor graphical objects. The translator has a number of options such as selecting a graphical objects input stimulus 38 for translation, translating a graphical objects control logic 40, allowing dynamic memory allocation 42, and sizing a data structure 44. A compiler 46 receives the high-level computer language code from the translator 36. A run time system 48 executes a graphical design. A control editor 50 is connected to the graphics editor 32. A library of graphical objects 52 is connected to the graphics editor 32.

From a user's perspective the system is remarkably easy to use. The user assembles a graphical display from shapes and components in the library 52. An input/stimulus is defined and a behavior/response is defined for that input. This stimulus and response correlation is repeated throughout the display range of the graphical display. These behavior states are stored in the system's memory. The system may be directed to interpolate a behavior response when the stimulus input is between programmed values. When the stimulus/response definition is complete, the tools required for that phase of graphical display construction may be closed or hidden from view on the computer screen, leaving just the run time system in view. The run time system 48 allows the user to operate the interface within the limits of its programming to test the functionality of the program. The system may operate a simulated hardware unit or may be connected to a real hardware unit to ensure the program's compatibility. If the interface operates as desired, the system may be directed to send the high-level computer language code to the compiler 46, to create a compiled code for the selected hardware. If the interface does not operate as desired, or if the design is found to be awkward to use, it is a simple matter to rearrange, remove, or replace the undesirable design elements, using the same software tools that were used to create the graphical display.

Figure 4:
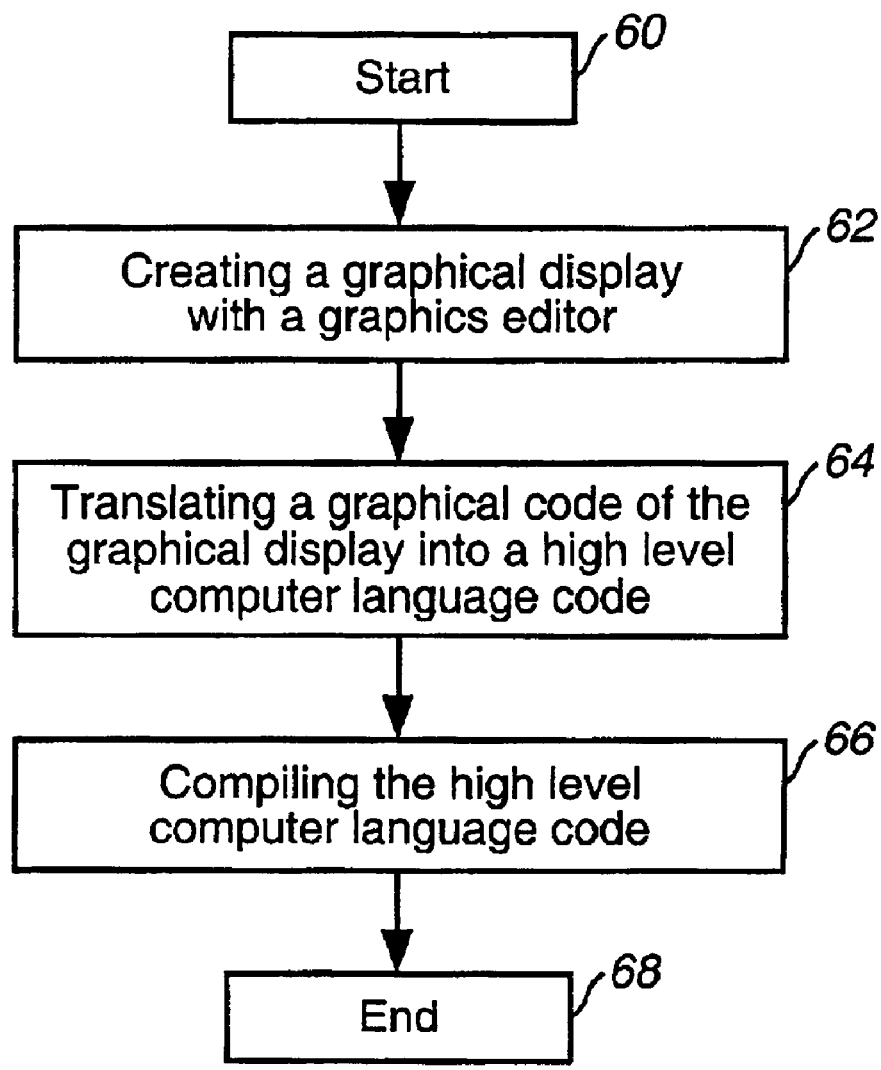
FIG. 4 is a flow chart of a method of designing, testing, and employing graphical computer code in accordance with one embodiment of the invention.

FIG. 4 is a flow chart of a method of designing, testing, and employing graphical computer code in accordance with one embodiment of the invention. The process starts, step 60, by creating a graphical display with a graphics editor at step 62. The system translates a graphical code of the graphical display into a high level computer language code at step 64. At step 66 the system compiles the high level computer language code which ends the process at step 68. In one embodiment, the system identifies a target processor for a compiler. In another embodiment, the system examines a plurality of objects to be translated, and determines if dynamic memory allocation is selected. When dynamic memory allocation is not selected, the system allows the user to select memory allocation sizes. In another embodiment, the system translates a graphical objects input stimulus, translates a graphical objects control logic, and translates a graphical objects graphical representation. In another embodiment, the system creates an animation sequence by example, and creates an animation input stimulus.

Figure 5:
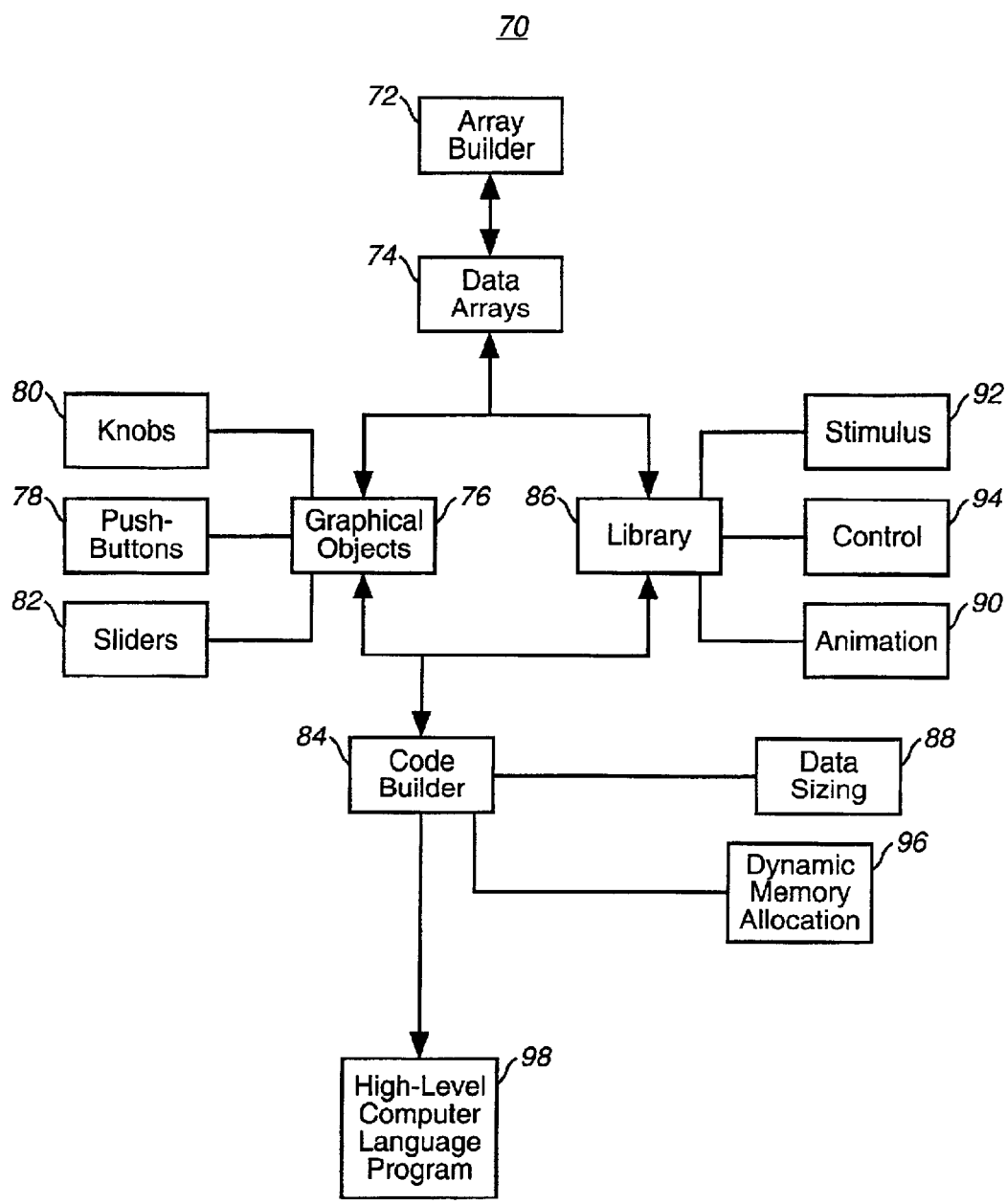
FIG. 5 is a block diagram of a translation system for designing, testing, and employing graphical computer code in accordance with one embodiment of the invention.

FIG. 5 is a block diagram of a translation system 70 for designing, testing, and employing graphical computer code in accordance with one embodiment of the invention. An array builder 72 constructs a data array 74 from a plurality of graphical objects 76, including push-buttons 78, knobs 80, and sliders 82. A code builder 84 translates a high-level computer language code from the data array 74. A library of computer code operations 86 is connected to the code builder 84. In one embodiment, the code builder 84 includes a data sizing function 88. In another embodiment, the library of computer code operations 86 includes a of library of files for graphics drawing and files for generating animation 90, stimulus 92, and control 94 codes. The code builder 84 includes a dynamic memory allocation choice 96. The code builder 84 assembles a high-level computer language program 98.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A system for designing, testing, and employing graphical computer code comprises: a graphics editor for creating a graphical display made up of a plurality of graphical objects constructed by the graphics editor;

a translator for creating a high-level computer language code that creates the graphical display, the translator connected to the graphics editor; and a compiler receiving the high level computer language code from the translator.

2. The system of claim 1, further including: a run time system connected to the graphics editor, the run time system designed to execute a graphical design.

3. The system of claim 1, further including: a control editor connected to the graphics editor.

4. The system of claim 1, further including: a library of graphical objects connected to the graphics editor.

5. The system of claim 1, wherein the translator includes an option of translating a graphical objects graphical representation.

6. The system of claim 1, wherein the translator includes an option of translating a graphical objects input stimulus.

7. The system of claim 1, wherein the translator includes an option of translating a graphical objects control logic.

8. The system of claim 1, wherein the translator includes an option of allowing dynamic memory allocation.

9. The system of claim 1, wherein the translator sizes a data structure.

10. A method for designing, testing, and employing graphical computer code including:

(a) creating a graphical object with a graphics editor;

(b) translating a graphical object of a graphical display into a high level computer language code; and (c) compiling the high level computer language code.

11. The method of claim 10, wherein step (c) further includes:

(c1) identifying a target processor for a compiler.

12. The method of claim 10, wherein step (b) further includes:

(b1) examining a plurality of objects to be translated;

(b2) determining if a dynamic memory allocation is selected;

(b3) when the dynamic memory allocation is not selected, selecting a memory allocation size.

13. The method of claim 10, wherein step (b) further includes:

(b1) translating a graphical objects input stimulus;

(b2) translating a graphical objects control logic;

(b3) translating a graphical objects graphical representation.

14. The method of claim 10, wherein step (a) further includes:
   (a1) creating an animation sequence by example;
   (a2) creating an animation input stimulus.

15. A system for designing, testing, and employing graphical computer code comprises:
   a graphics environment for creating a graphical display made up of a plurality of graphical objects constructed by the graphics environment;
   a translator for creating a high-level computer language code designed to create the graphical display, the translator connected to the graphics environment; and
   a control editor connected to the graphics environment.

16. The system of claim 15, further including:
   a library of components within the graphics environment.

17. The system of claim 15, further including:
   a run time system within the graphics environment, the run time system designed to execute a graphical design.

18. The system of claim 15, wherein the translator includes an option of translating a graphical objects input stimulus.

19. The system of claim 15, wherein the translator includes an option of translating a graphical objects control logic.

20. The system of claim 15, wherein the translator includes an option of translating a graphical objects graphical representation.

21. The system of claim 15, wherein the translator includes an option of allowing dynamic memory allocation.

22. The system of claim 15, wherein the translator sizes a data structure.

23. A translation system for designing, testing, and employing graphical computer code comprising:
   an array builder for constructing a data array from a plurality of graphical objects;
   a code builder for translating a high-level computer language code that creates the graphical objects from the array data; and
   a library of computer code operations connected to the code builder.

24. The system of claim 23, wherein the code builder includes a data sizing function.

25. The system of claim 23, wherein the library of computer code operations comprises a library of files for generating an animation, stimulus, and control code.

26. The system of claim 23, wherein the code builder includes a dynamic memory allocation choice.

* * * * *